Oct. 11, 1966    J. P. TARBOX    3,278,050
BALE STACKER
Original Filed April 24, 1963    5 Sheets-Sheet 1
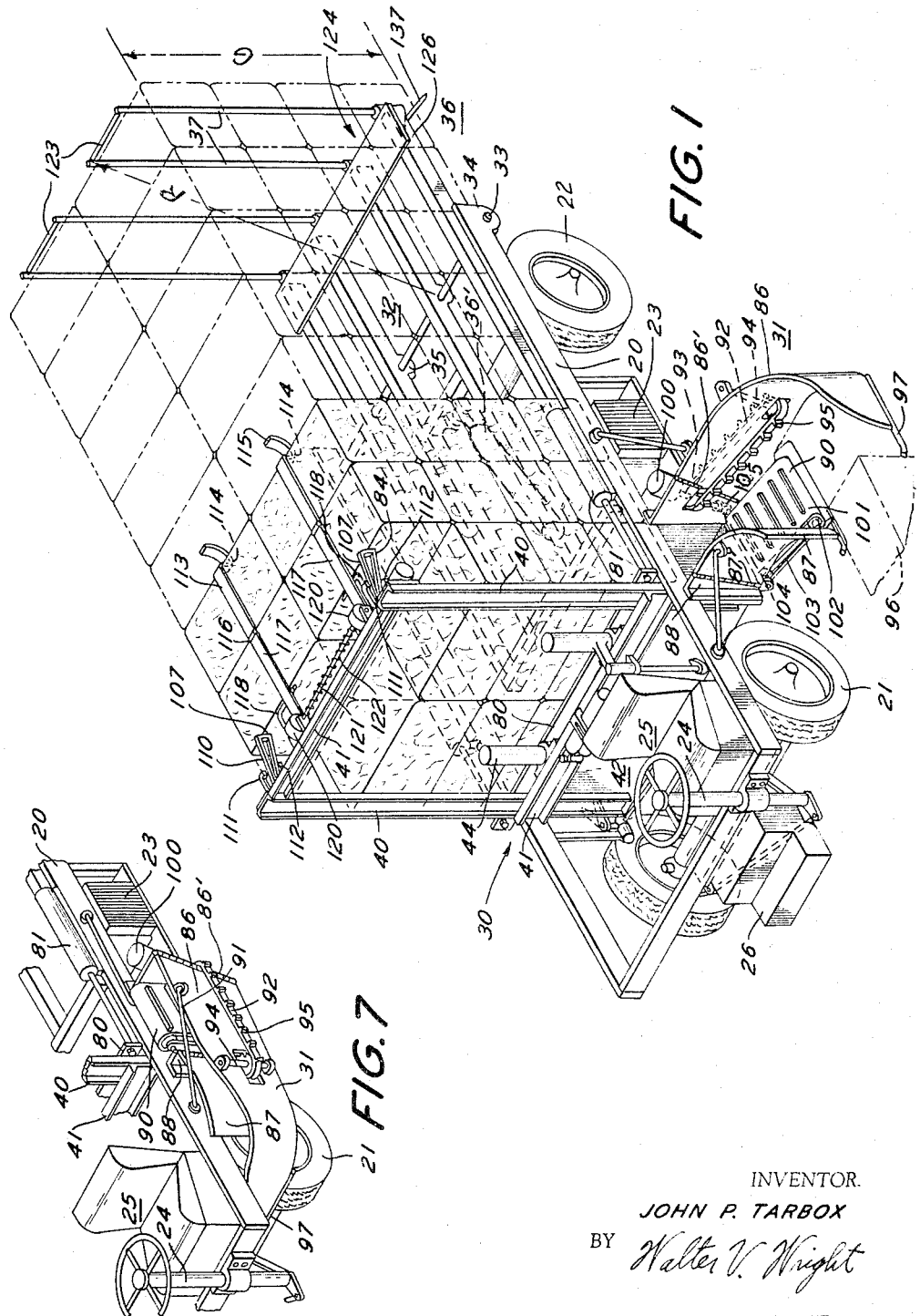
INVENTOR.
JOHN P. TARBOX
BY *Walter V. Wright*
AGENT Oct. 11, 1966  J. P. TARBOX  3,278,050
BALE STACKER
Original Filed April 24, 1963
5 Sheets-Sheet 2
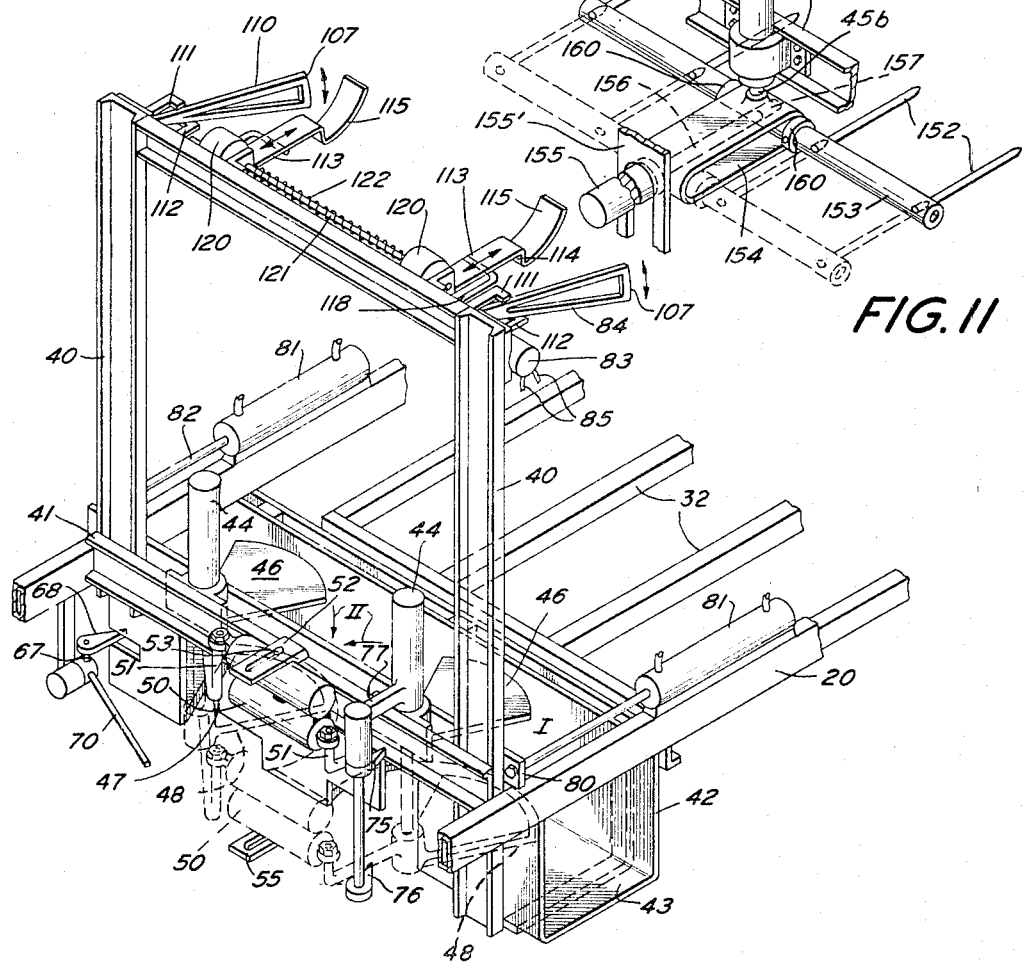
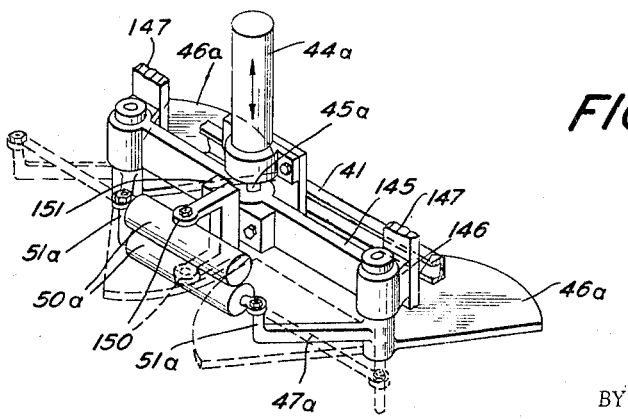
INVENTOR.
JOHN P. TARBOX
BY  *Walter V. Wright*
AGENT Oct. 11, 1966          J. P. TARBOX          3,278,050
BALE STACKER Original Filed April 24, 1963          5 Sheets-Sheet 3

INVENTOR.
JOHN P. TARBOX
BY Walter V. Wright
AGENT

Oct. 11, 1966 J. P. TARBOX 3,278,050
BALE STACKER
Original Filed April 24, 1963 5 Sheets-Sheet 4

INVENTOR.
JOHN P. TARBOX
BY Walter V. Wright
AGENT

Oct. 11, 1966  J. P. TARBOX  3,278,050
BALE STACKER
Original Filed April 24, 1963  5 Sheets-Sheet 5
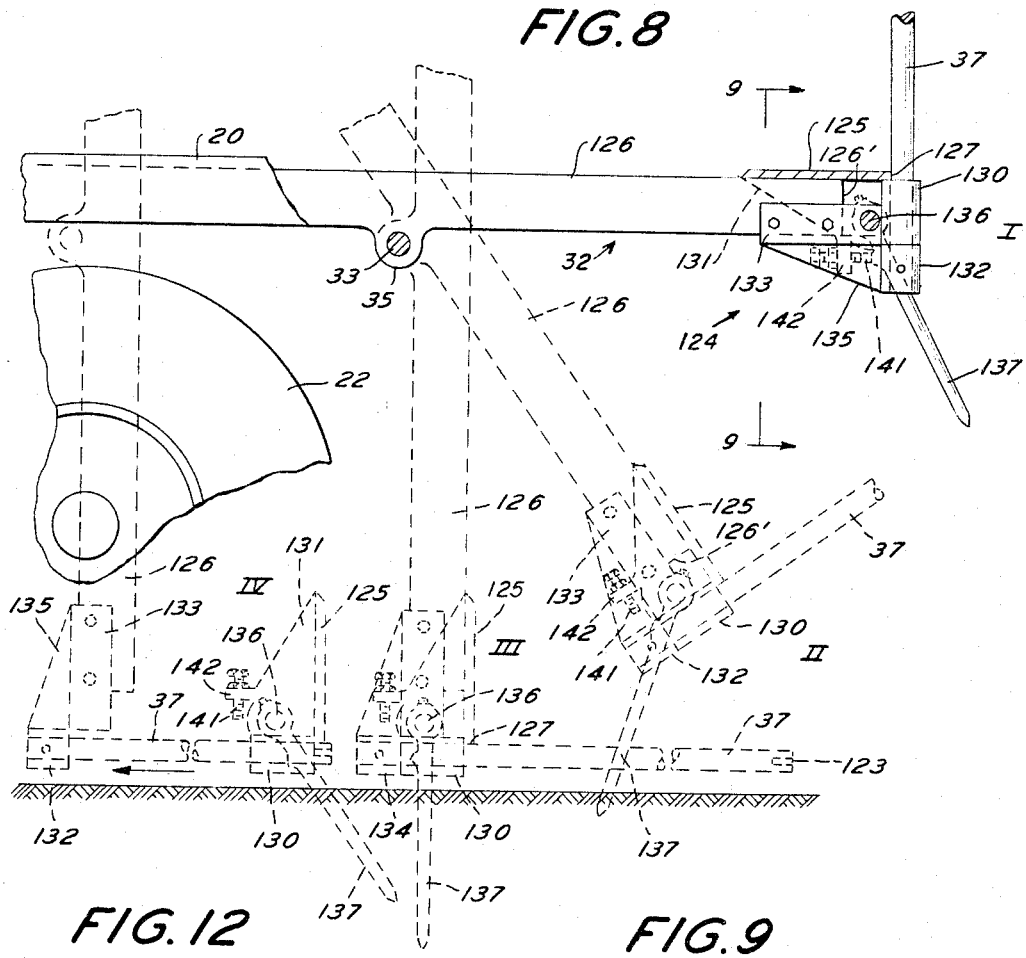
INVENTOR.
JOHN P. TARBOX
BY Walter V. Wright
AGENT

United States Patent Office 3,278,050
Patented Oct. 11, 1966

3,278,050
BALE STACKER
John P. Tarbox, Delray Beach, Fla., assignor to Sperry Rand Corporation, New Holland, Pa., a corporation of Delaware
Continuation of application Ser. No. 275,323, Apr. 24, 1963. This application Apr. 21, 1965, Ser. No. 451,690
10 Claims. (Cl. 214—6)

This invention relates to a truck or wagon-like vehicle for automatically picking up from the ground, wagon stacking and then ground stacking bales of hay, and particularly to a fully automatic such vehicle.

The general aim is an overall improvement over and upon U.S. Patent No. 2,848,127. This application is a continuation of application Serial No. 275,323, now abandoned.

Importantly, it is the purpose of this invention to materially increase the capacity of such a wagon or truck. This is achieved principally by initially and directly, as the bales are received from the ground, building up the wagon stacks vertically from their bottoms and at the fore-front of the wagon, and as the wagon stacks are completed transferring them rearwardly to a ground stack forming and carrying frame which extends the remaining length of the wagon. By this process, hitherto existing limitations of both the height and length of the wagon load and hence, complementally, the limitation of the ground section and the height of the ground stack are removed. This follows from the fact that there are no limitations except road clearance upon the height of the stacks, and since these are built vertically at the fore-front of the wagon and transferred rearwardly as they are completed, the entire rearward length of the wagon is available for load carrying.

The means used for such vertical stack building from the bottom are special embodiments of vertically acting forklift mechanisms.

A substantial object is the adaptation of the type of ground pickup of the above mentioned patent to deliver picked up bales for vertical stack building from the bottom, improvement in efficiency, lessening damage of bales incident to pickup and delivery, and the provisions for the substantially flat folding of the pickup mechanism to the side of the wagon. Flat folding to the side of the wagon avoids interference with the stacking mechanism and also reduces width for passage through gates and road travel.

These things are achieved mainly by providing a bale receiving floor below the stack location and below the wagon floor or chassis level, and arranging the pickup mechanism to pickup and move bales horizontally to the low level receiving floor rather than vertically. The flat folding is achieved by independently hinging the sides and bottom of the pickup structure to the side of the wagon to be folded there against.

Another specific object is the provision of wagon travel push off mechanism. This is achieved by providing a ground stack push off board or plate with stakes pushed into the ground by the dumping action per se to anchor the board, so holding the push off board stationary and enabling the back stanchions to be withdrawn from beneath the stack by simply driving the wagon ahead. In such manner the need for a special hydraulic motor is eliminated, the mechanism is simplified, and its action made more reliable.

Simplification and accessibility for adjustment and repair have also been objects. Removal of the hydraulic motors and their adjustments and controls from beneath the chassis, and their location and consolidation at the front and sides of the wagon places them in easy reach of the operator aide in these areas.

Other objects and the means in detail for achieving all of the aims and objects will be disclosed in the accompanying drawings and following detailed description thereof.

Of the drawings:

FIG. 1 is a right front perspective view of the truck or wagon from an elevated position showing in full lines: the vertical forklift stacking mechanism from the front, the associated ground pickup in extended or pickup position, the operator's seat and steering wheel as mounted upon a frontal extension of the chassis, and the truck in process of being loaded, a partial load consisting of two complete stacks moved rearwardly from the frontal location of the vertical stack building mechanism and a stack partially completed in the stack building mechanism; and, depicted in dotted lines, a ground bale about to be picked up and sufficient bales on the truck to complete the truck load.

FIG. 2 is an enlarged perspective of the vertical stack building mechanism from the same angle as in FIG. 1.

FIG. 7 is a perspective of the lower portion of the left front of the truck showing the pickup mechanism folded flatwise against the side of the truck.

FIG. 8 is a fragmentary side elevation showing one form of the ground stake push off mechanism in several different stages of operation.

FIG. 9 is a section taken on the line 9—9 of FIG. 8.

FIGS. 10 and 11 are, respectively, perspectives of two modifications of the vertically acting forklift truck stack building mechanism.

FIG. 12 is a side elevation of an extremely simplified form of ground stake push off mechanism.

Figure 3:
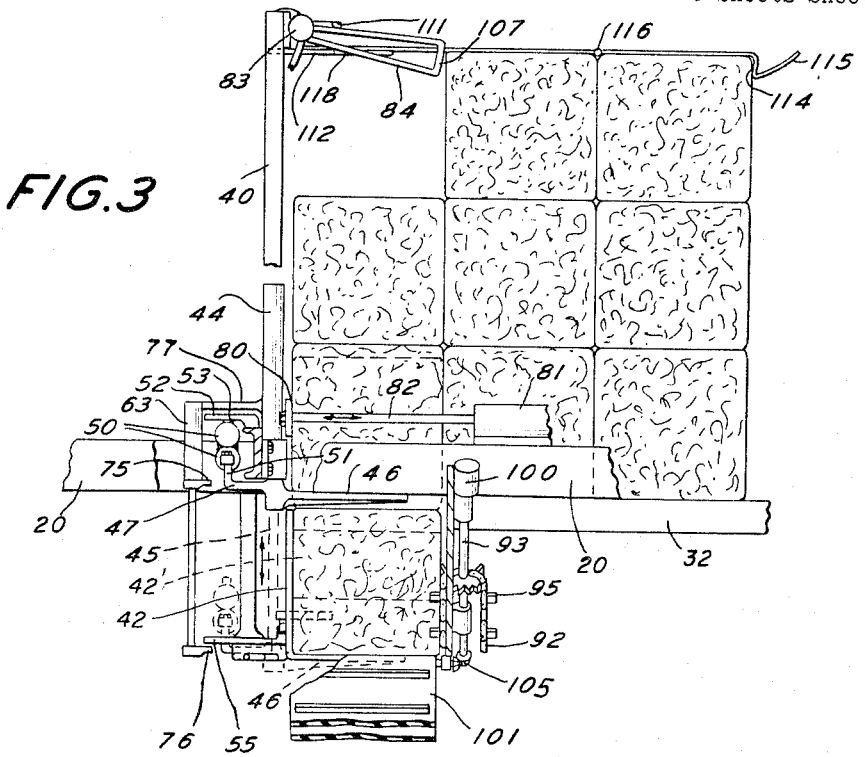
FIG. 3 is an enlarged side elevation of the vertical stacking mechanism with certain parts removed, sectioned, or broken away to improve the clarity.

While built especially for accommodation of the mechanisms for achieving full automatic truck and ground stacking, the truck body and its supporting ground wheels their suspensions and its steering, motor and control mechanisms, are organized much as they are usually organized for the purpose of transporting goods on highways. As such the vehicle comprises chassis 20, front and rear pairs of wheels 21 and 22, a power plant 23, a steering mechanism 24, a seat 25 in front for the operator, and a step 26 for his access to the seat. Not shown are the transmission mechanism from motor to wheels, wheel suspensions, or brakes. Chassis 20 is shown as provided with a frontal extension which not only accommodates the seat for the operator and the steering mechanism, but also provides a region for front wheel suspension.

Located immediately behind frontally located operator's seat 25 is the vertical truck-stack-building mechanism, generally designated 30 in FIG. 1, which thus operates at the fore-front of the truck. Projecting from the left front of the truck, located in the same transverse plane as the vertical stacking mechanism 30, and feeding picked up bales to the bottom of the mechanism 30 is the bale pickup mechanism 31. The entire length of the truck at chassis level is occupied by the load carrying and dumping frame 32. This frame is pivotally borne from the rear end of chassis 20 by a cross shaft 33 connected with the rear end of the chassis by a depending shaft bearings 34. Connection between the load carrying frame 32 and the pivoting shaft 33 is by bearings 35 depending from the frame rails 126. These rails receive and support the truck stacks as they are formed. As usual in this type of truck the rear end of the chassis 20 is terminated substantially in a vertical plane tangent to the rear wheels 22 and the overhang of the rear end of the frame 32 beyond the rear end of the chassis is such that when frame 32 is raised to a vertical position to dump the load and so form the ground stack, its rear end 36 is substantially if not quite at ground level, see FIG. 8. A series of vertical stanchions 37 confine the truck stacks at the rear. Raising to dump is usually done by a hydraulic motor such as 36' shown in dotted lines in FIG. 1, mounted and operated as shown in the U.S. Patent No. 2,848,127 previously referred to.

The vertical truck stack building mechanism 30, shown more clearly in FIG. 2, comprises a rectangular arrangement of vertical and horizontal frame members 40 and 41 respectively secured to each other and to the chassis 20 interiorly thereof. The vertical members 40 extend above the plane of the chassis 20 to a height sufficient to accommodate the entire vertical height of the truck sack, in this case shown to be the height of four bales placed one above the other. These vertical members 40 are also extended down below the plane of the chassis 20 a distance somewhat greater than the vertical height of a bale to be built into the stack. As so downwardly extended they support a transversely extending box-like casing 42. This casing extends all the way across the chassis, is wholly open at the top and its left end, but either closed or provided with a bale stop means 42' at its right end. Its bottom or floor is closed with exception of the arcuate fork receiving openings 48. This floor 43 constitutes a receiving and supporting floor for the bales as they are picked up from the ground by pickup mechanism 31.

The bale supporting floor 43 is located low to the ground and somewhat more than bale height or thickness below the lower edge of the chassis frame 20, so that the picked up bales may readily enter casing 42. Carried by the lower of the two transverse frame members 41 are two vertically acting forklift type mechanisms designated by numerals 44 applied to the vertically extending hydraulic cylinders which operate them. These mechanisms, except for their forks 46, are located in or just in front of the vertical transversely extending planes of frame 40, 41.

These forklift type mechanisms 44 comprise, beside their motor cylinders to which the designating numeral 44 is applied, piston rods 45 (FIGS. 3 and 4) which depend from the cylinders and which, of course, are provided with the usual pistons. Rods 45 carry on their lower ends by means of suitable hubs (see FIGS. 2 to 4) segment shaped forks 46 of a radial extent sufficient to reach to and rearwardly past a transverse vertical plane passing through the centers of gravity of the bales being stacked. Moreover, the segments 46 each has an angular and outer peripheral extent sufficient to give it lateral reach on each side of the center of gravity of the bales of hay it lifts to afford them vertical stability even when their center of graviy lies somewhat to one side of the vertical longitudinal plane of symmetry of the segment fork when in lifting position. Extending forwardly from the hub, each fork is provided with an operating arm 47 (see FIGS. 1 to 3) by means of which the segmentlike fork may be swung into and out of lifting position in the bale receiving case 42 and hence into and out of the vertical projections of the bales being stacked. Swung to positions outside of the plan form of casing 42, as indicated in dotted lines in FIG. 5, the forks 46 are vertically lowerable to or slightly beyond the plane of floor 43 of the casing 42. The cylinders 44 and the piston rod 45 which carry the segments 46 have stroke lengths which afford an operating fork lowering and raising stroke sufficiently greater than the actual distance between their lowermost position and the bottom plane of the chassis to reach a little above the top plane of the carrying frame 32, whereby the completed truck stack may be pushed from the forks onto the carrying frame.

Figure 4:
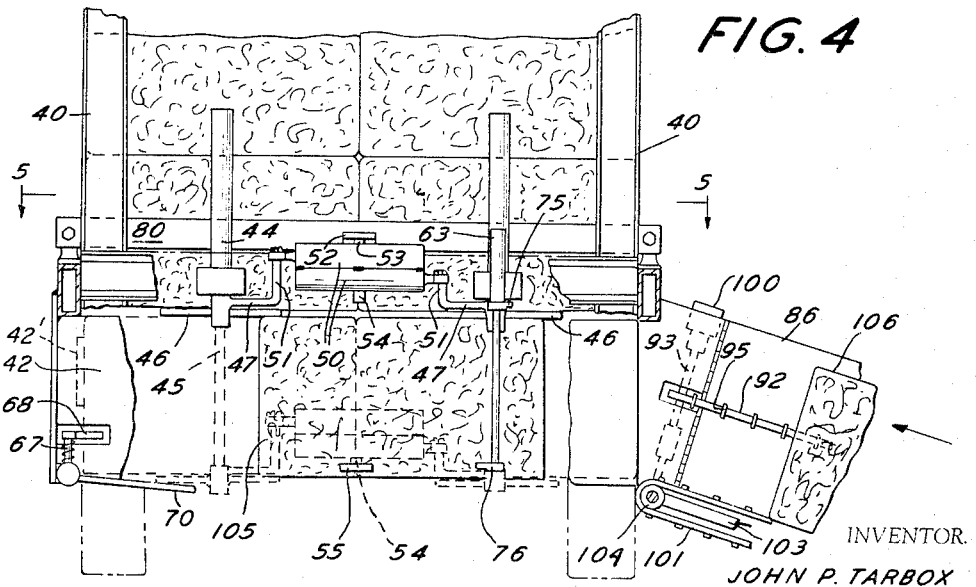
FIG. 4 is an enlarged front elevation of the portion of the truck stacking mechanism shown in FIG. 3.
Figure 5:
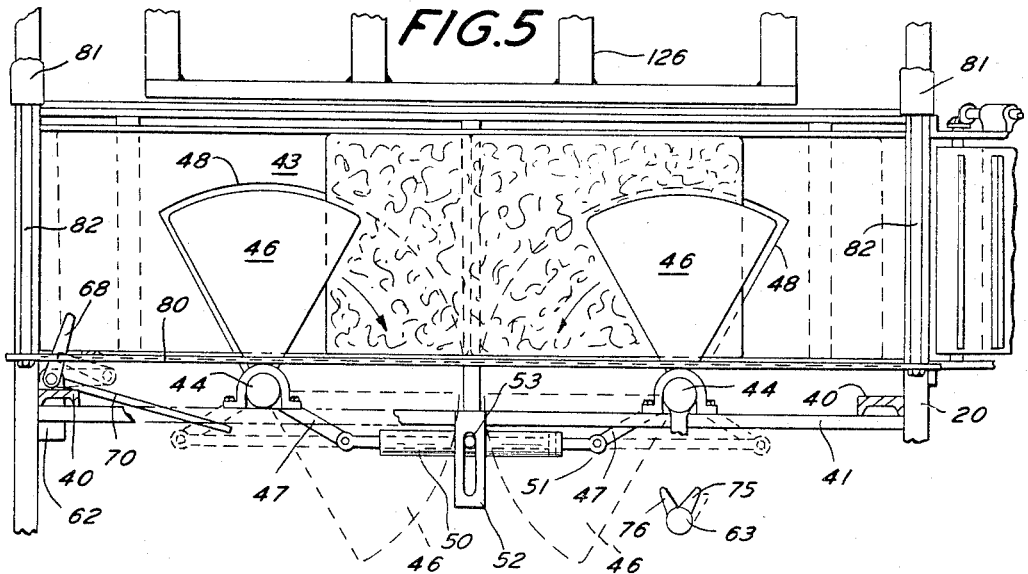
FIG. 5 is a horizontal cross section on line 5—5 of FIG. 4 on an enlarged scale.

The floor 43 of the casing 42 is arcuately cut away at 48 as indicated in FIG. 5 and also in FIG. 2 to permit the segments 46 when lowered to the dotted line position shown in FIGS. 2 and 4 to be angularly turned into the opening 48 to positions in which they underlie the centers of gravity of the respective bales of the pair which may then occupy casing 42 as well as the bales above them. This position is indicated in full lines in FIG. 5. The means for so advancing and retracting the segments 46 comprises a pair of hydraulic cylinders 50, each of which is piston rod connected to one of the operating arms 47 through a vertically extending end 51 of the arm. The pair of cylinders 50 is fixed together as a unit (see the indicated welds in FIGS 2 and 3) and the unit floats with the arms 47 as the segments are lowered or raised. A longitudinally slotted bracket 52 projects forwardly from the lower horizontal frame member 41 and a pin 53 carried by the upper wall of the upper cylinder 50 enters the slot in 52 when the cylinders are in their upper positions. When forks 46 and cylinders 50 are in their lower position, that shown in dotted lines, a similarly slotted bracket 55 supported from casing 42 coacts with a pin 54 carried from the underside of the bottom cylinder 50. These pins and slots keep cylinders 50 (and hence fork 46) properly centered. Obviously, the angle subtended by the arcuate cut outs 48 in the floor 43 of the casing 42 (see again FIG. 5) needs to be considerably greater than the angular extent of the fork segments 46 (say 120° as compared with 60°) and therefore the arms 47 must travel the same greater angular distance (such as 120°), and moreover must travel it symmetrically with respect to a longitudinal vertical plane through a point midway between the respective forklift mechanisms.

The cycle of operation of the forklift is this: assuming segments 46 are in the position shown in full lines in FIGS. 2 through 5 and the first two bales to be picked up are in the casing 42 ready to be lifted to truck stack level. Pressure previously applied to cylinders 44 to lift them also holds them at the upper level shown in full lines. The first step in the cycle of operation is the application of pressure to the pair of cylinders 50 to swing segments 46 from their in to their out position as shown in dotted lines in FIG. 5. Next pressure is put upon the upper ends of cylinders 44 to lower the retracted segments to the dotted line lower level shown in FIG. 4. There, pressure is applied to the opposite ends of the cylinders 50 to again move segments 46 into openings 48 in floor 43 within the plan form of casing 42, this time at a level below the bottoms of the first two bales to be introduced into the casing, as shown in dotted lines in FIG. 2. Thereupon the lifting pressure is applied to the bottom ends of cylinders 44 to raise the bales to the level of the top bale carrying frame 32. The continuance of the hydraulic pressure retains them in that position and the first two bales so raised form the bottom of the first truck stack. When the next two bales are picked up and inserted into the casing 42, the cycle just recited is repeated, this time however, when pressure is applied to cylinders 50 to retract the forks 46, the already lifted pair of bales is released to rest upon the tops of the newly introduced pair of bales, and when the upper pair is so rested and the segments have been retracted, lowered and again advanced within the bottom wall 43 of the casing 42, the ensuing forklift operation acts to raise both pairs of bales, both the first introduced pair and the second. So lifted the pair is held by cylinders 44 in truck stack forming position as illustrated especially in FIG. 3.

Figure 6:
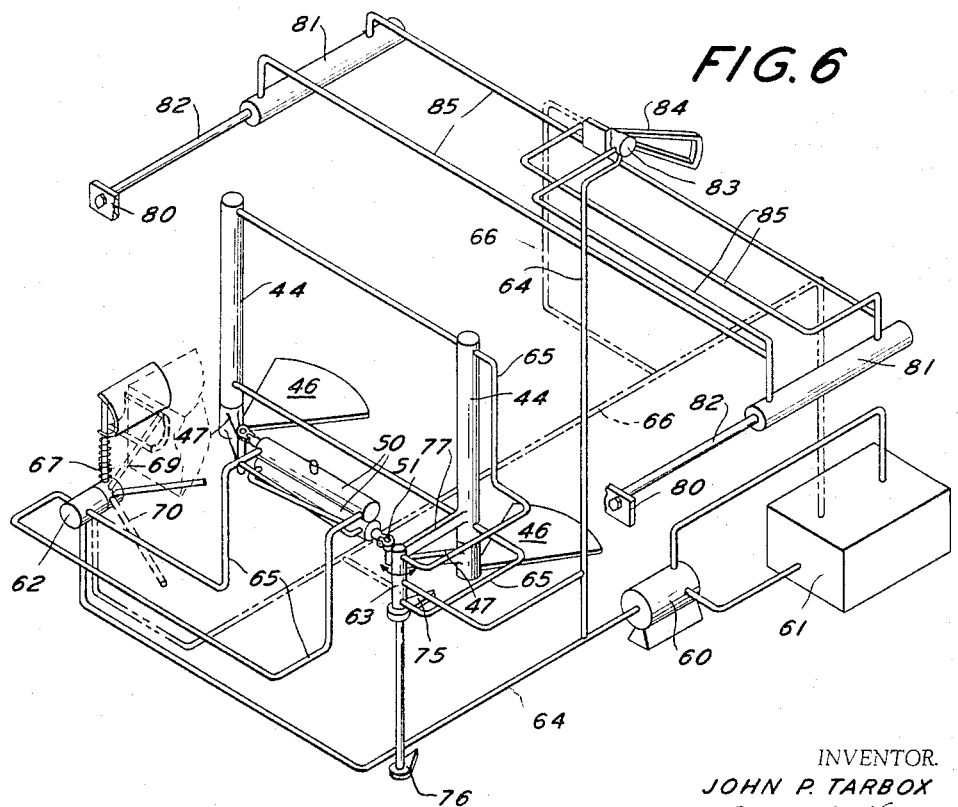
FIG. 6 is a diagram of the hydraulic motors employed together with their controls and interconnections, the whole shown in perspective to improve clarity.

Symbolically illustrated in FIG. 6 are a high pressure hydraulic pump 60 having the usual suction and overflow connections to a tank 61, a three-way rotary control valve 62 for the cylinders 50 used in retracting and advancing the segments 46, and a similar rotary three-way control valve 63 used for the control of cylinders 44. Each valve has connection to the common pressure line 64 leading from the pressure side of pump 60, connections 65 to opposite ends of the respective hydraulic motors 50 and 44 which they respectively control, and a fluid return line connection 66 to tank 61. Valve 62 controlling cylinders 50 for retracting and advancing is operated by two levers the one 67 engaged by the end of the first bale to be introduced into casing 42 (FIGS. 1 to 4) through a transversely extending spring pressed detent 68, which is biased clockwise about the lever 67 to its transverse position by spring 69 strongly enough to enable the bale to operate the valve 62 by oscillating lever 67 counterclockwise without displacing the spring 69. The other lever 70 lies in the vertical path of descent of the arm 47 when in the dotted line retracted position shown in FIG. 5. This lever 70 is long enough to exert considerable leverage, a leverage sufficient to overcome the tension of the biasing spring 69, carry detent 68 counterclockwise to lie along the side of the bale as shown in dotted lines in FIG. 5, and so operate valve 62 clockwise to its segment advancing position. Here it remains until the bale is raised above detent 68 because when the detent lies alongside the bale the force of the spring is exerted axially of the valve and not transaxially as when it lies across the end. Valve 63 controlling cylinders 44 also has two operating arms respectively numbered 75 and 76 respectively engaged by the upper and lower ends of pin 51 of the left hand fork arm (appearing right in the drawing) when that arm is respectively in its retracting and advancing positions. However, arms 75 and 76 lie at different elevations, elevations spaced apart from each other a distance somewhat greater than the lowering and lifting stroke of cylinders 44, with the result that arm 75 is engaged when forks 46 are being retracted in their upper level positions and arm 76 is engaged when forks 46 are being advanced from their lower level positions. Valve 63 is carried at the end of the arm 77 (FIGS. 3 and 6) projecting from the side of the left hand cylinder 44, while valve 62 is mounted on the wall of casing 42 (see FIG. 4).

The control system so organized carries the cycle through in the following manner. The second bale projected by the pickup 31 into the casing 42 carries the first bale into engagement with the detent 68 on the end of valve lever 67 of valve 62, so operating the valve counterclockwise. This admits operating fluid to the opposite ends of the cylinders 50 from which the piston rods connected with pins 51 project, forcing arms 47 outwardly and retracting the segments 46 from the plan form of the stacker casing 42 to the outer position indicated in plan in FIG. 5. When the right hand arm 47 carries its pins almost to the end of its movement the lower end of pin 51 engages the valve lever 75 oscillating valve 63 clockwise to admit pressure to the upper ends of the lowering and lifting cylinders 44 whereupon segments 46 are moved downwardly to their lower levels (shown in dotted lines in FIG. 5). At this juncture or near to it the right hand arm 47 engages valve lever 70 and moves it clockwise to a position exhausting fluid from the piston head ends of cylinders 50 and admitting pump pressure from lines 64 to the piston rod ends, thereby driving arms 47 toward each other to the dotted line position shown in FIG. 2 and advancing forks 46 into the plan form of casing 42 just beneath the lower surfaces of the two bales which now occupy the casing. Just before the lifting forks 46 reach the innermost positions the lower ends of pins 51 on the left engages the lower valve lever 76, thereby reversing the valve 63, exhausting operating fluid from the upper ends of cylinders 44 and supplying fluid under pressure to the lower ends whereupon the cylinders lift the segments 46 which constitute the forks from the lower level to the upper level shown in full lines in the several figures and lifting the bales which they underlie with them. To provide for smoother passing of bale surfaces and detent 68 I prefer to give it the convex plate like engaging surface depicted in the diagram of FIG. 5. Observe that the cylinders 50 are centered and the movements of the lifting forks 46 equalized in each the lower and upper positions of the cylinders 50 (which float with the raised and lowered arms 47) by the cylinder carried pins 53 and 54 engaged in the slots of the brackets 52 and 55 respectively carried by the lower cross member 41 and the casing 42. The next pair of bales picked up causes a repetition of the cycle, a repetition a duplicate of the first in all respects save that fact that when retraction of the segments 46 is instituted by operation of valve 62 and the segments 46 leave the plan form of casing 42 the bales first lifted toward the upper level are lowered a small degree to rest upon the upper sides of the newly introduced pair of bales until the newly introduced pair as the second cycle progresses is lifted level and carries the first introduced pair on its back, so to speak. Thus, the cycle is repeated until the stack has reached a pre-determined height when a transfer mechanism is operated to move the first formed stack rearwardly.

This transfer mechanism comprises a transverse head board or bar 80 which flanks the front side of the lowermost pair of bales of the formed stack, together with chassis borne motor cylinders 81 connected thereto at their outwardly projected ends by their piston rods 82 (FIG. 3) and having strokes sufficient to pull the completed stack from its supporting segments 46 onto the body of the carrying frame 32. Automatic action and control is achieved through a three-way valve 83 mounted upon cross member 41 of vertical frame members 40, and having a valve operating lever 84. The topmost bale of the stack, when it engages lever 84, lifts the lever and admits operating fluid to the front ends of cylinders 81 to carry the transfer board 80 rearwardly and with it, of course, the entire completed stack. So as soon as the stack reaches and rests upon the front ends of the rails 126 of the load carrying frame 32, gravity acts upon the lever 84 (given appropriate mass) returning valve 83 to its normal position in which fluid is exhausted from the front ends of the cylinders 81 and admitted to the rear ends of these cylinders thereby returning the transfer board 80 to its normal extreme front position. The space occupied by the stack so transferred is now free for the building of the next succeeding stack. In FIG. 6, the relationship of the valve 83 to the remaining portions of the hydraulic system at large is clearly shown. It has pressure connection to the pump pressure line 64 and an exhaust connection to the return fluid line 66 leading to the supply tank 61 while its two cylinder controlling ports are connected by ducts 85 commonly to the respective ends of transfer actuating cylinders 81.

The pickup device 31 is best shown in FIGS. 1 and 7, while its section is shown in FIG. 3. Its frame and wall structure is comprised of rear wall 86, front wall 87 and bottom wall or floor 90. Each of these respective walls are hinged to the side of the chassis by way of gussets 88 secured to the side walls of the chassis supported bale receiving case 42. The hinge axes are clearly discernable from the folded and extended positions of the pickup shown, respectively, in FIGS. 7 and 1. While these hinge axes all lie approximately in the same vertically extending plane, that of the bottom wall structure 90 is extending horizontally somewhat below the bottom of the receiving case 42, and the two side wall hinges are inclined upwardly and outwardly at a small angle, an angle sufficient to permit the outer ends of these walls to reach to or substantially to the ground. This enables these walls to be folded substantially flatwise against the side of the chassis in the manner shown in FIG. 7; the bottom structure 90 being folded upwardly and the two side walls 86, 87 being folded forwardly. In order, the front side wall 87 is folded, first, and bottom wall 90 second to get it out of the way of the rear wall 86, and the rear wall last. Together they are retained as folded in FIG. 7, by the hook 91. The rear wall carries substantially centrally of its body a bale conveying and directing chain 92 whose sprockets are respectively mounted on journalling shafts 93 and 94, so mounted in wall borne bearings as to present the inner run of the chain sufficiently forward of the wall structure 86 to enable its flights 95 to be engaged with the end wall of a bale as a bale is impacted by the rapidly moving truck. The outer ends of the walls 86 and 87 are gently curved outwardly and forwardly to such extent as to be able to guide an approached bale, such as 96 in FIG. 1, into a position to have its head impacted by the chain. The walls 86 and 87 are provided with ground skids 97 having upturned ends. The chain 92 is driven by a hydraulic motor 100 connected with the upper end of the innermost shaft 93, driven at a speed sufficiently high to throw the impacted bale onto the bottom wall structure 90 of the pickup and turn and project it transversely toward and into the open end of the case 42. The inner convex surface of the front wall 87 aids chain 92 and the inner concaved surface of wall 86 in this turning and projecting movement. The bottom wall structure 90 on its part is comprised of a transversely flighted belt 101 carried by bottom and top rollers 102, 104 borne in side frame 103. The upper roller is driven by bevel gears 105 at the bottom of the chain motor driven shaft 93. Thus, when the bale is turned upon the bottom structure 90 and entered into the case 42 belt 101 strongly engages the bottom of the bale and drives it still farther into the casing to a position approximately that shown in FIGS. 4 and 5 in which its rear end is some distance beyond the entering end of casing 42 while its forward end is yet short of the opposite end of the case 42 and the valve lever 67 and detent 68. It is the next bale to enter, and as the bale designated 106 in FIG. 4 which strikes the rear end of the preceding bale 105 and drives it all the way to the outer end of the case 42 to engage and operate valve lever 67, 68 and institute the stack building cycle. So organized, the pickup, truck stacking, and stack transfer mechanisms in use in the field altogether automatically pick the bales up from the ground one by one and load the truck stack by stack from the front rearwardly until the entire portion of the truck behind the stacking mechanism is filled with stacks all the way to the stanchions 37.

In this process the first and subsequent stacks transferred to the load carrying platform 32 are steadied against rear displacement during incline or rough travel by front and rear members engaging the stacks at their tops. The front stack steadying means is comprised of the vertically extended ends 107 of valve lever 84 and a similar but idle lever 110 mounted upon cross beam 41 at the opposite side of the truck (see FIGS. 2 and 3). In form and length levers 84 and 110 are such that when gravity drops them back to stops 111 and 112 after valve 83 has been operated, ends 107 engage behind the upper ends of the uppermost bales of the newly transferred stack. Instead of being associated with a valve such as 83 lever 110 is merely pivoted upon the same transverse line and operates between its stops 111 and 112. The rear ends of the bales at the top of the stack are engaged by the hook shaped ends 114 of elongated narrow flat metal members 113 of a length substantially a bale width. The bottom ends of hooks 114 are upwardly and rearwardly turned as shown at 115. The front ends 116 of the members 113 are hinged to the rear ends each to one of a pair of belts 117 (FIG. 1) which are normally rolled up in a coil between the side flanges of flanged drums 120 fixedly mounted upon a shaft 121 journalled from upper frame member 41. About shaft 121 is coiled a long spiral spring 122, whose one end is connected to a fixed point on the upper cross member 41 of the frame, the connection not shown but as usual made in such manner as to constantly urge the shaft and the drums it carries to roll the belts up as a window shade is rolled up on its roller. By virtue of the fact that the length of the plate hooks 113 is substantially the width of the bales the hooks are engaged by the rear sides of the topmost bales as soon as the transfer movement to the bed 32 commences and the hooks and their anchoring belts 117 are carried rearwardly by the stack and by the succeeding stacks as the loading progresses. As the rearmost stack reaches a position within a few inches of the stanchions 37 at the end of the load carrying platform 32 the curved upwardly inclined ends 115 of the stacks steadying plate hooks 113 engage crossbars 123 carried by the stanchions 37, and hooks 133 are lifted out of engagement with the top rear of the rearmost stack whereupon the spring 122 recoils belts 117 on drums 120 and withdraws the hooks 113 all the way to their frontal positions (shown in FIG. 2) where they once more rest above the underlying rest rods 118 which project from cross bar 41, and are again in position to be engaged by and steady the first stack of the succeeding truck load. In transit to the point of dumping (and thereby converting the truck load to a ground stack) the rear end of the load, when plate hooks 113 are so withdrawn rests against the stanchions 37 while the front end continues to be steadied by the rear ends 107 of the valve lever 84 and the similar lever 110.

Arrived at location for the ground stack, the dumping to ground stack form is carried out by simply admitting pressure by a manual valve (not shown, but in reach of the operator, as in U.S. Patent No. 2,848,127), to the dumping cylinder 36' (see FIG. 1) to raise the load carrying frame 32 about its pivot shaft 33 to a vertical position thereby resting the rear end of the load upon the stanchions 37 and further moving the stanchions downwardly to a horizontal position substantially at ground level. So raising the load carrying frame 32 to a vertical position automatically brings into operation a ground stack push off mechanism designated 124 in FIG. 1, but shown in detail and in various stages of its operation in FIGS. 8 and 9.

This ground stack push off mechanism comprises a relatively wide and long push off plate 125 normally extending flatly across the rails 126 at the end of platform 32 which bears the truck stacks. Its outer edge 127 adjoins the bases of the stanchions 37. Stanchions 37 are tubular and of the same cross section from end to end and plate 125 is borne on the stanchions slidably by sleeves 130 which are connected with plate 125 through lateral bracing 131 from the sleeves. To accommodate sleeves 130 rails 126 are terminated a short distance in front of the stanchions as shown at 126'. Stanchions 37 each have a socketed connection with these foreshortened rear ends through a socket fitting 132 having a horizontally extending angular belted on connection 133 to the rails 126. A bracing and strengthening fin 135 connects the fitting 132 and connection 133. Journalled in member 131 which bears push off 125 and extending (see FIG. 9) transversely of the stanchions 37 and between the bodies thereof and the terminal ends 126' of the rails 126 is a cross shaft 136. This shaft 136 has fixed to it adjacent its journals in member 131 a series of pointed stakes 137. The central section of this shaft 136 is shown as provided with a very strong heavy and strong elongated biasing spiral spring 140 whose ends connect respectively to the shaft 136 and to one of the members 131. Other such springs may also be provided on each side of the central one if needed. This spring biases the stakes 137 as a group normally to a position somewhat to the rear of a right angle position with respect to the rails ends 126, and with the body of the stake against an angle adjusting and fixing stop 141 carried by a projection 142 from a journalling member 131 of shaft 136.

The operation of this push off mechanism is depicted in several of its stages in FIG. 8. The full line showing is that occupied before the load carrying platform 32 has been operated toward the unloading position. This full line position is designated I. In dotted lines a second stage designated II is shown, and in this position the stakes 137 have just engaged their points with the ground. In position III the load carrying platform 32 is truly vertical and the stakes have been rotated to a vertical position substantially parallel to the bed 32 and penetrated full length into the ground. Thereupon when the truck is moved forwardly stanchions 37 are withdrawn from under the load while the load is held stationary, for the pusher plate 125 is firmly staked to the ground by the powerful spring tension action thereby preventing the load from moving with the stanchions. The stanchions slide freely through sleeves 130 and relatively freely from under the ground stack. As the last of the load becomes rested upon the ground the crossbars 123 at the outer ends of the stanchions engage the tops of the sleeves 130 and carry with them the sleeves, plate 125, cross shaft 136, and the stakes 137, tilting the stakes while yet in the ground as shown in stage IV. The great tractive force exerted by the truck as it moves ahead in low gear readily cants the stakes 137, moving the soil ahead of them as it overcomes the high resistive force of the spring (or springs) 140. The stakes increase in inclination at first, whereupon the now heavily rearwardly inclined stakes are plowed through the soil at the lesser depth for a foot or two. At or near this juncture the dumping motor 36′ (see FIG. 1) is supplied with fluid to slowly return carrying platform 32 toward its normal horizontal position raising the outer ends of the stanchions 37 and removing stakes 137 from the ground. As the rear of platform 32 raises tension of springs 140 is first gradually released as the stakes rise, and as soon as they are free of the ground the springs snap them quickly back to the full line positions of stage I. The length, the cross sectional shapes of the stakes, their variation and extension, the number and power of springs 140, the angular relation of stops 142 and the stakes, and the number and power of springs 140 will all be chosen to suit the conditions to be met.

As usual in a case of the more complex automatically operating mechanisms and systems, this invention too is susceptible to modification without departing from its generic spirit. For example, in FIG. 12 is a modified form of ground stake push off mechanism. This form is considerably simplified. Parts having the same functions are designated by same reference numerals but to each the suffix "a" has been applied. It will be noted that the angled ground stakes 137a are rigidly connected with the sleeve 130a which bear the push off plates 125, and that the shaft 136 which carried ground stakes 137 in the first form of this device has been omitted with the result that there is no need for more than contact or clearance space between the terminal ends of the rails 126a and sleeves 130a. For many ground conditions and many of the lighter load conditions, the simplified device of FIG. 12 will be found quite adequate in spite of the fact that the number of stakes would appear to be limited, whereas in the first form described the number of stakes and reacting springs is unlimited and may be adjusted to suit loads of any weight.

Obviously, these stack push off mechanisms are not suited for banking successive ground stacks against each other because of the fact that the radius R from pivot 33 of carrier frame 32 to the tops of the stanchions 37 is greater than the ground dimension G of the stack. If close banking is desired the push off mechanism of U.S. Patent No. 2,848,127 may be used. Such mechanisms erect the new ground stack and back the stack against a preceding one before the push off mechanism is actuated.

In FIG. 10 is shown one modification of a forklift type mechanism per se and in FIG. 11 is shown another. The form of FIG. 10 is essentially the same as that of FIG. 1 and attendant figures save that instead of employing two lowering and lifting cylinders 44 but one, 44a, is used, and the fork segments 46a are carried pivotally at opposite ends of a bar 145 rigidly connected with the lower end of the piston rod 45a of cylinder 44a. The bar 145 is stabilzed by pads 146 which bear against vertically extending intermediate vertical frame members 147 (connected in any suitable manner to transverse frame members 41 and casing 42). The floating cylinders 50a used to advance and retract the fork members 46a operate upon the forks through arms 47a as before, but in this case they are not welded or otherwise connected to each other but are separately mounted upon and centered by in the trucks vertical plane of symmetry by pivotal connection with the bracket 151 borne centrally by the bar 145. So borne each can swing about its pivot as the arc of movement of its connected arm 47a requires.

Control valves and levers for cylinders 44a similar to those used for cylinder 44, of course, are appropriately located to coact with the upstanding ends 51a of the arms 47a through which connection with the piston rods are made.

The modification of FIG. 11 is greatly simplified. Its forks 152 instead of being segment shaped as are the forks 46 and 46a are tine shaped or bar shaped. They are projected through and welded to extend horizontally from a transversely extending large diametered tube 153. This tube is centrally borne within a centrally located loop shaped casting 154 in a manner to be reciprocated longitudinally of the truck from one end of the loop to the other to retract and advance the forks. Advancing and retracting movements are effected by a longitudinally extending hydraulic cylinder 155 fixed to the front end of the loop casting and having a piston rod 156 extending centrally longitudinally of the loop and weld connected through the tube 153 at 157 in a manner to retain fork tines 152 in the plane of the loop. A single lifting cylinder designated 44b raises and lowers the loop casting 154 through rigid connection of the lower end of its piston rod 45b with the top of the loop, whereby all the parts borne by the loop may be lowered and raised, to enable the forks 152 as retracted and advanced to be projected beneath a pair of bales to lift them from a lower to a higher level. A pair of collars 160 carried by tube 153 and slidably engaging the sides of the casting 154 prevents angular canting of the tube 153 within the loop during its reciprocating therein, so minimizing possible transverse bending forces on piston rod 156. A slotted vertically extending plate 155′ which may be affixed to the frame 40, 41 and casing 42 in any suitable and convenient manner (not shown) embraces the body of cylinder 155 within its slot and prevents such rotation of the entire fork mechanism as might otherwise take place with piston rod 45b as an axis.

Controls such as 63, 75 and 76 for the lifting cylinder 44b will, of course, be located and supported from the frame 40, 41 and casing 42 in such position that they can be operated by the advance and retraction movements of reciprocation of the fork tube 153, in the same manner in which in the two previous forms of the mechanism described they are operated by the advance and retraction angular movements of the arms 47 and 47a. Such a position would be to one side of one end of tube 153 where arms or detents 75 and 76 would respectively be engaged upon opposite reciprocations of the tube even as 47 and 47a engage them upon opposite oscillations. A control lever 70, for the cylinder 155 which succeeds to the fork advancing and retracting functions of cylinders 50 and 50a will be positioned and extended as necessary to be operated from retracted tube 153 or the nearest fork 152 as they approach their lowermost positions.

Having thus described my invention, what I claim is:

1. In a bale loading and carrying vehicle, means for vertically stacking bales on the vehicle comprising a vertically acting forklift standing vertically of the vehicle at the forefront thereof and embodying fork means, means for vertically lifting and lowering said fork means, and means for advancing and retracting said fork means at respectively different levels, said lifting and lowering means moving the fork means during lifting and lowering operations respectively in vertical zones horizontally separated from each other, means for receiving and supporting bales lengthwise transversely of said vehicle between said levels and within the lifting and without the lowering zone of said fork means, a load carrying platform disposed immediately rearwardly of said bale receiving and supporting means, said vertically acting forklift having a vertically extending frame erected upon the vehicle immediately in front of said load carrying platform, means for transferring completed stacks to said platform, and means supported from said frame for steadying the transferred stacks, said steadying means embodying a longitudinally extensible hook connected with said frame and supported thereby in a position to be engaged by the rear side of the first stack transferred from said building mechanism to said load carrying platform.

2. A load carrying and stacking vehicle according to claim 1 in which said hook is connected with the frame by an extensible flexible connection biased at said frame to return said hook thereto when moved therefrom by advancing stacks loaded on said platform, together with stanchions upwardly projected from the rear of said platform and provided with means to lift the hook from engagement when said stack approaches said stanchions.

3. A load carrying and stacking vehicle according to claim 2 provided in addition with ground stack load push off mechanism, embodying ground stakes loosed from the ground by engagement with said hook lift means carried by the stanchions.

4. In a loading and stacking vehicle for bales of hay or like material having elongated longitudinal sides and relatively short transverse ends, a chassis having a front end and a rear end, wheels on said chassis supporting the chassis for movement forwardly through a field, a load carrying platform mounted on said chassis, means on said chassis for supporting bales directly in front of said load carrying platform with said elongated bale sides transverse to the direction of travel of said chassis, said supporting means having an opening toward one side of the chassis to receive bales, means carried on said chassis adjacent said opening to engage bales extending longitudinally relative to said chassis and turn and feed said bales end first transversely through said opening onto said supporting means, means on said chassis for building a vertical stack of transversely extending bales in overlying relation to said supporting means, and means transferring each stack as completed horizontally rearwardly of said platform, the particular stack building means comprising bale engaging and lifting members supported on said chassis forwardly of said bale supporting means, means for advancing and retracting said bale engaging members in a fore-and-aft direction relative to said chassis between a rearwardly disposed lifting position under bales overlying said supporting means and a forwardly disposed retracted position in front of said supporting means, means for raising and lowering said bale lifting members between a lower level below said supporting means and an upper level at least a bale height above said lower level, and control means operating said advancing and retracting means and said raising and lowering means to advance said bale engaging members to said rearward lifting position under bales on said supporting means at said lower level, then move said bale engaging members vertically upwardly to said upper level while in their rearwardly advanced position to raise a bale vertically from said lower level to said upper level, then retract said bale engaging members to their forward position after a subsequent bale has entered said supporting means to deposit said raised bale on top of said subsequently received bale, and then move said bale engaging members downwardly to said lower level while in retracted position in preparation for subsequent advancing and lifting movements to form said stack.

5. A loading and stacking vehicle for bales of hay or like material having elongated longitudinal sides and relatively short transverse ends comprising, a chassis having a front end and a rear end, wheels on said chassis supporting the chassis for movement forwardly through a field, a load carrying platform mounted on said chassis and having a forward end disposed rearwardly of said chassis front end, means on said chassis for supporting bales directly in front of said load carrying platform with said elongated bale sides transverse to the direction of travel of said chassis, said supporting means having an opening toward one side of the chassis to receive bales, means carried on said chassis adjacent said opening to engage bales extending longitudinally relative to said chassis and turn and feed said bales end first transversely through said opening onto said supporting means, means carried by said chassis for building a vertical stack of transversely positioned bales in overlying relation to said bale supporting means, said stack building means comprising bale engaging and lifting members supported on said chassis forwardly of said bale supporting means, means for advancing and retracting said bale engaging members in a fore-and-aft direction relative to said chassis between a rearwardly advanced lifting position under said supporting means and a forwardly disposed retracted position forwardly of said supporting means, means for raising and lowering said bale lifting members between a lower level below said supporting means and an upper level at least a bale height above said lower level, control means operating said advancing and retracting means and said raising and lowering means to sequentially advance said lifting members at said lower level, raise said advanced lifting members to said upper level, retract said lifting members at said upper level and then lower said retracted lifting members back to said lower level to build a vertical stack of bales by first lifting a bale upwardly from said supporting means then depositing it on top of a subsequent bale received on said supporting means then lifting said subsequent bale with said first bale resting thereon and repeating this sequence to form a stack of bales of predetermined height, means on said chassis operable to engage the forwardly disposed longitudinal sides of bales in said vertical stack and move the stack rearwardly onto said load carrying platform, and control means for actuating said stack moving means when the vertical stack reaches said predetermined height.

6. A bale loading and stacking vehicle as recited in claim 5 wherein said means for advancing and retracting said bale lifting members comprises a first motor unit, and wherein said means for raising and lowering said bale lifting members comprises a second separate motor unit.

7. A bale loading and stacking wagon as recited in claim 5 wherein said bale engaging and lifting members comprise duplex fork means disposed to lift two bales received and positioned end to end on said supporting means, one fork means to each bale, and wherein said means for advancing and retracting said bale lifting members comprises a first hydraulic cylinder and said means for lifting and lowering said bale lifting members comprises a second separate hydraulic cylinder.

8. A bale loading and stacking wagon as recited in claim 5 wherein said bale engaging and lifting members comprise fore-and-aft extending laterally spaced generally horizontal tines, means mounting said tines for generally horizontal reciprocation in the fore-and-aft direction relative to said chassis.

9. A loading and stacking vehicle for bales of hay or like material having elongated longitudinal sides and relatively short transverse ends comprising a chassis, wheels on said chassis supporting the chassis for movement forwardly through a field, a load-carrying platform mounted on said chassis, means on said chassis for supporting bales directly in front of said load carrying platform with said elongated bale sides transverse to the direction of travel of said chassis, said supporting means having an opening toward one side of the chassis to receive bales, means carried on said chassis adjacent said opening to engage bales extending longitudinally relative to said chassis and turn and feed said bales end first transversely through said opening onto said supporting means, means carried by said chassis for building a vertical stack of transversely positioned bales in overlying relation to said bales supporting means by adding bales successively to the bottom of the stack, and means transferring each stack as completed horizontally rearwardly onto said platform, said stack building means comprising bale engaging and lifting members supported on said chassis forwardly of said bale supporting means, means for moving said lifting members in a fore-and-aft direction relative to said chassis between a rearwardly advanced lifting position under bales on said bale supporting means and a forwardly disposed retracted position in front of said bale supporting means, and means for raising said bale engaging members from a lower level under said bale supporting means to an upper level at least a bale height above said bale supporting means when said bale engaging members are advanced whereby similarly oriented bales may be moved in onto the bale supporting means so that upon retraction of the bale engaging members, bales on the latter are deposited on the bales in the supporting means and upon lowering and extension of the bale engaging members the entire stack may be lifted by the latter.

10. A loading and stacking vehicle for bales of hay comprising, a chassis having a front end and a rear end, wheels on said chassis supporting the chassis from movement forwardly through a field, a load carrying platform mounted on said chassis and having a forward end disposed rearwardly of said chassis front end, means adjacent the front of said load carrying platform for supporting bales lengthwise transversely of said chassis, said supporting means having an opening toward one side of the chassis to receive bales, means carried on said chassis adjacent said opening to engage bales extending longitudinally relative to said chassis and turn and feed said bales transversely through said opening onto said supporting means, means carried by said chassis for building a vertical stack of transversely positioned bales in overlying relation to said bale supporting means, said stack building means comprising plate members of segmental form, pivot means mounting said plate members on said chassis for fore-and-aft oscillation in a horizontal plane, means for pivotally advancing and retracting said plate members in a fore-and-aft direction relative to said chassis on said pivot means between a rearwardly advanced lifting position under said supporting means and a forwardly disposed retracted position forwardly of said supporting means, means for raising and lowering said plate members between a lower level below said supporting means and an upper level at least a bale height above said lower level, control means operating said advancing and retracting means and said raising and lowering means to sequentially advance said plate members at said lower level, raise said advanced plate members to said upper level, retract said plate members at said upper level and then lower said retracted plate members back to said lower level to build a vertical stack of bales by first lifting a bale upwardly from said supporting means then depositing it on top of a subsequent bale received on said supporting means then lifting said subsequent bale with said first bale resting thereon and repeating this sequence to form a stack of bales of predetermined height, means on said chassis operable to engage the forwardly disposed longitudinal side of bales in said vertical stack and move the stack rearwardly onto said load carrying platform, and control means for actuating said stack moving means when the vertical stack reaches said predetermined height.

References Cited by the Examiner
UNITED STATES PATENTS

| | | | |
|---|---|---|---|
| 2,586,324 | 2/1952 | Graves | 214—83.26 |
| 2,799,418 | 7/1957 | Haldimann | 214—730 |
| 2,848,127 | 8/1958 | Grey. | |
| 2,999,608 | 9/1961 | Ganahl. | |
| 3,107,803 | 10/1963 | Glosup | 214—654 X |
| 3,159,287 | 12/1964 | Stroup. | |

GERALD M. FORLENZA, *Primary Examiner.*

M. TEMIN, J. E. OLDS, *Assistant Examiners.*